United States Patent
Rao et al.

(10) Patent No.: US 9,740,462 B2
(45) Date of Patent: Aug. 22, 2017

(54) ADAPTIVE, CONTEXT-AWARE, MODEL-BASED SUGGESTIONS

(71) Applicants: Akhila Rao, Bangalore (IN); Ashudeep Reshi, Bangalore (IN); Ashwin Vijayendra, Karnataka (IN); Indeevar Reddy Aduri, Bangalore (IN); Makesh Balasubramanian, Bangalore (IN); Nanda Hiregowdar, Bangalore (IN); Poornesh Bharathipura Sharma, Karnataka (IN); Pradeep Kumar Panda, Sambalpur (IN); Shiva Prasad Nayak, Bangalore (IN); Sudhansu Mohanty, Orissa (IN)

(72) Inventors: Akhila Rao, Bangalore (IN); Ashudeep Reshi, Bangalore (IN); Ashwin Vijayendra, Karnataka (IN); Indeevar Reddy Aduri, Bangalore (IN); Makesh Balasubramanian, Bangalore (IN); Nanda Hiregowdar, Bangalore (IN); Poornesh Bharathipura Sharma, Karnataka (IN); Pradeep Kumar Panda, Sambalpur (IN); Shiva Prasad Nayak, Bangalore (IN); Sudhansu Mohanty, Orissa (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/470,440

(22) Filed: Aug. 27, 2014

(65) Prior Publication Data

US 2016/0062745 A1    Mar. 3, 2016

(51) Int. Cl.
G06F 9/44 (2006.01)

(52) U.S. Cl.
CPC .................. *G06F 8/33* (2013.01)

(58) Field of Classification Search
CPC .................. G06F 8/35; G06F 8/33
USPC .................. 717/104–117
See application file for complete search history.

(56) References Cited

U.S. PATENT DOCUMENTS

| | | | |
|---|---|---|---|
| 7,296,264 B2 * | 11/2007 | Zatloukal | G06F 8/33 717/116 |
| 8,266,585 B2 * | 9/2012 | Funt | G06F 8/33 717/106 |
| 2014/0156639 A1 | 6/2014 | Shridhar et al. | |

OTHER PUBLICATIONS

Chris Sells, "Hello, Data", Jun. 2010, Retrieved from https://msdn.microsoft.com/en-us/library/ff754344.aspx, 25 pages.*

Julie Lerman, "Entity Framework 4.1 Validation", Apr. 2011, retrieved from https://web.archive.org/web/20130511014615/http://msdn.microsoft.com/en-us/data/gg193959.aspx, 4 pages.*

(Continued)

*Primary Examiner* — Ted T Vo
(74) *Attorney, Agent, or Firm* — Fish & Richardson P.C.

(57) ABSTRACT

The present disclosure describes methods, systems, and computer program products for providing a web-based integrated development environment (IDE) solution hosted on a cloud environment. One computer-implemented method includes receiving an entity data model extensible markup language (XML) (EDMX) model, receiving an indication of user input from a user input device, providing auto completion suggestions based on received user input, determining whether the provided auto completion selections are acceptable, and determining whether the ECMX model is complete and in a logical state.

17 Claims, 11 Drawing Sheets

(56) References Cited

OTHER PUBLICATIONS

DevForce 2010 Resource Center, "DevForce Development", Aug. 2012, Retrieved from http://drc.ideablade.com/xwiki/bin/view/Documentation/, sections, Model, Edit the EDMX as XML, and Validate, 8 pages.*

Amit Nigam, "Getting started with OData Model Editor on SAP River RDE", Jul. 2014, SAP Community Network, 4 pages.*

Codelite.org, "Code Completion", Aug. 2012, Retrieved from http://codelite.org/LiteEditor/CodeCompletion, 2 pages.*

Han et al., "Code Completion From Abbreviated Input", 2009, IEEE, pp. 332-343.*

* cited by examiner

FIG. 5

```
*Test.edmx  X

1  ▶  <edmx:Edmx Version="1.0" xmlns:edmx="http://schemas.microsoft.com/ado/2007/06/edmx" xmlns:xyz="http://www.xyz.com/Protocols/XYZData">
2  ▶  <edmx:DataServices xmlns:m="http://schemas.microsoft.com/ado/2007/08/dataservices/metadata" m:DataServiceVersion="2.0">
3  ▶    <Schema xmlns="http: // schemas.microsoft.com/ado/2008/09/edm" Namespace="">
4          <EntityType Name="">
5            <Key>
6              <PropertyRef Name=""/>
7  ┌─────────────────────────────────────────────────────────────────────────────────────────┐
   │ [facet"pattern"] The value "is not accepted by the pattern "[\p{L}\p{Nl}][\p{L}\p{Nl}\p{Nd}\p{Mn}\p{Mc}\p{Pc}\p{Cf}]{0,}"  │─ 502
   │ is not a valid value of the atomic type "TSimpleIdentifier".                            │
   └─────────────────────────────────────────────────────────────────────────────────────────┘
8          </EntityType>
9        </Schema>
10     </edmx:DataServices>
11   </edmx:Edmx>
12
```

```
*Test.edmx  ×
205  | </Association>
206  </Schema>
207 ▶ <Schema Namespace="System.Data.Objects" xmlns:d="http:schemas.microsoft.com/ado/2007/08/dataservices" xmlns:m="http://schemas.microsoft.com/a
208 ▶ | <EntityContainer Name="NowflixCatalog" m:IsDefaultEntityContainer="true">
209  |   <FunctionImport Name="Movies" EntitySet="Titles" ReturnType="Collection(Nowflix.Catalog.v2.Title)" m.HttpMethod="GET"./>
210  |   <FunctionImport Name="Series" EntitySet="Titles" ReturnType="Collection(Nowflix.Catalog.v2.Title)" m.HttpMethod="GET"./>
211  |   <FunctionImport Name="Seasons" EntitySet="Titles" ReturnType="Collection(Nowflix.Catalog.v2.Title)" m.HttpMethod="GET"./>
212  |   <FunctionImport Name="Discs" EntitySet="Titles" ReturnType="Collection(Nowflix.Catalog.v2.Title)" m.HttpMethod="GET"./>
213  |   <FunctionImport Name="Episodes" EntitySet="Titles" ReturnType="Collection(Nowflix.Catalog.v2.Title)" m.HttpMethod="GET"./>
214 ☐ <EntitySet Name="Genres" EntityType=""/>
215  |   <EntitySet Name="Titles" EntityType                    Nowflix.Catalog.v2.Genre
216  |   <EntitySet Name="TitleAudioFormats" E                  Nowflix.Catalog.v2.Language
217  |   <EntitySet Name="TitleAwards" Entity                   Nowflix.Catalog.v2.Person        rmat"/>
218  |   <EntitySet Name="People" EntityType=                   Nowflix.Catalog.v2.Title          Format"/>
219  |   <EntitySet Name="TitleScreenFormats"                   Nowflix.Catalog.v2.TitleAudioFormat
220  |   <EntitySet Name="Languages" EntityTyp                  Nowflix.Catalog.v2.TitleAward
221 ▶ <AssociationSet Name="Title_Disc" Ass                     Nowflix.Catalog.v2.TitleScreenFormat
222  |   | <End Role=:"Title_Disc_Source" Entit
223  |   | <End Role=:"Title_Disc_Target" Entit
224  | </AssociationSet >
225 ▶ <AssociationSet Name="Title_Season" Association="Nowflix.Catalog.v2.Title_Season">
```

```
*Test.edmx  X
 5 ▼  <EntityType Name="Genre">
 6 ▼    <Key>
 7 ▼      <PropertyRef Name="Name"/>
 8      </Key>
 9      <Property Name="Name" Type="Edm.String" Nullable="false" MaxLength="128" Unicode="true" FixedLength="false" MaxLength="false" m:FC_TargetPath="Syndication
10      <NavigationProperty Name="Titles" Relationship="Netflix.Catalog.v2.Genre_Titles" FromRole="Genre_Titles_Source" ToRole="Genre_Titles_Target"
11      </EntityType>
12 ▼  <EntityType Name="Title" m:HasStream="true:>
13 ▼    <Key>
14 ▼      <PropertyRef Name=""/>
15      </Key>
16      <Property Name="Id"         ="false" MaxLength="128" Unicode="true" FixedLength="false"/>
17      <Property Name="Name"    📄 AverageRating        le="true" MaxLength="Max" Unicode="true" FixedLength="false" m:FC_TargetPath="S
18      <Property Name="Short"   📄 BluRay               lable="true" MaxLength="Max" Unicode="true" FixedLength="false"/>
19      <Property Name="Synop"   📄 BoxArt               lable="true" MaxLength="Max" Unicode="true" FixedLength="false"/>
20 ▼    <Property Name="Short"   📄 DateModified         Nullable="true" MaxLength="Max" Unicode="true" FixedLength="false"/>
21      <Property Name="Avera"   📄 Dvd                  Nullable="true"/>
22      <Property Name="Releas"  📄 Instant              Nullable="true"/>
23      <Property Name="Url"     📄 Name                 ="true" MaxLength="Max" Unicode="true" FixedLength="false"/>
24      <Property Name="Runti"   📄 NowflixApiId         Nullable="true"/>
25      <Property Name="Ratir"                           Nullable="true"/>
26 ▼    <Property Name="Date"                            ="true" MaxLength="Max" Unicode="true" FixedLength="false"/>
27      <Property Name="Type" Type="Edm.String" Nullable="true" MaxLength="Max" Unicode="true" FixedLength="false"/>
```

```
*Test.edmx  ✕

220  | <EntitySet Name="Languages" EntityType="Nowflix.Catalog.v2.Language"/>
221 ▶| <AssociationSet Name="Title_Disc" Association="">
222  |     <End Role="Title_Disc_Source" EntitySet="Title      ┌─────────────────────────────────────────────────────────┐
223  |     <End Role="Title_Disc_Target" EntitySet="Title      │                          ▭                              │
224  | </AssociationSet>                                        │  📖 Nowflix.Catalog.v2.Genre_Titles                     │
225  | <AssociationSet Name="Title_Season" Association         │  📖 Nowflix.Catalog.v2.Language_Titles                  │
226  |     <End Role="Title_Season_Source" EntitySet="         │  📖 Nowflix.Catalog.v2.Person_TitlesActedIn             │
227  |     <End Role="Title_Season_Target" EntitySet="T        │  📖 Nowflix.Catalog.v2.Person_TitlesDirected            │
228  | </AssociationSet>                                        │  📖 Nowflix.Catalog.v2.Title_Disc                       │
229 ▶| <AssociationSet Name="Title_Series" Association+        │  📖 Nowflix.Catalog.v2.Title_Discs                      │
230  |     <End Role="Title_Series_Source" EntitySet="T        │  📖 Nowflix.Catalog.v2.Title_Episodes                   │
231  |     <End Role="Title_Series_Target" EntitySet="T        │  📖 Nowflix.Catalog.v2.Title_Movie                      │
232  | </AssociationSet>                                        │  📖 Nowflix.Catalog.v2.Title_Season                     │
233  | <AssociationSet Name="Title_Movie" Association=         └─────────────────────────────────────────────────────────┘
234  |     <End Role="Title_Movie_Source" EntitySet="T
235  |     <End Role="Title_Movie_Target" EntitySet="Titles"/>
236  | </AssociationSet>
237 ▶| <AssociationSet Name="TitleAudioFormat_Title" Association="Nowflix.Catalog.V2.TitleAudioFormat_Title">
238  |     <End Role="TitleAudioFormat_Title_Source" EntitySet="TitleAudioFormats"/>
239  |     <End Role="TitleAudioFormat_Title_Target" EntitySet="Titles"/>
240  | </AssociationSet>
```

600c, 602c

ADAPTIVE, CONTEXT-AWARE, MODEL-BASED SUGGESTIONS

BACKGROUND

An integrated development environment (IDE) is a software application that provides comprehensive facilities to computer programmers for software development. Some IDE features include, a source code editor, a compiler and/or an interpreter, build automation tools, and/or a debugger. There are two categories of IDE's: 1) a traditional desktop-based IDE and 2) a web-based IDE. A web-based IDE is a browser-based code development environment requiring no installation on a local developer workstation and which can be accessed with a connection to the server and an available browser using, for example, HTML5-based UI technology. A web-based IDE reduces hardware costs and management overhead while ensuring everyone with latest IDE version and patches. Consequently, developers can make code changes from anywhere, using any machine. Without the ability to manage entity data model extensible markup language (XML) (EDMX) files with support for, example, context-aware intelligent code completion and real-time validations, software development is more costly, takes more time, can be a less-than-pleasant experience, and requires more overall effort.

SUMMARY

The present disclosure relates to computer-implemented methods, computer-readable media, and computer systems for providing a web-based integrated development environment (IDE) solution hosted on a cloud environment. One computer-implemented method includes receiving an entity data model extensible markup language (XML) (EDMX) model, receiving an indication of user input from a user input device, providing auto completion suggestions based on received user input, determining whether the provided auto completion selections are acceptable, and determining whether the ECMX model is complete and in a logical state.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, comprising determining whether a schema associated with the user input is valid, wherein the determination is made using an open data protocol (ODATA) XML schema definition (XSD) file.

A second aspect, combinable with any of the previous aspects, comprising initiating display of schema validation errors.

A third aspect, combinable with any of the previous aspects, comprising: determining that a particular user input device input combination is pressed, and providing context-specific code-completion suggestions.

A fourth aspect, combinable with any of the previous aspects, comprising receiving an indication of a selection of a particular context-specific code-completion suggestion.

A fifth aspect, combinable with any of the previous aspects, comprising prefilling auto completion code snippets into an editor.

A sixth aspect, combinable with any of the previous aspects, comprising: triggering EDMX model validation, determining the validity of the EDMX model, and initiating a display of EDMX model validation errors.

The subject matter described in this specification can be implemented in particular implementations so as to realize one or more of the following advantages. First, the web-based IDE solution can be hosted on a cloud environment, enabling software developers a near-zero installation software development toolset. In addition, all software developers have access to the same version/patch level from any device, fixed and/or mobile. Second, the web-based IDE solution provides comprehensive facilities to computer programmers for software development. Some of the features of an IDE include, a source code editor, a compiler and/or an interpreter, build automation tools and a debugger. These facilities include support for context-aware intelligent code completion (intellisense) and real-time validations which help reduce developer effort and enhance developer software development experiences. Third, the web-based IDE editor can speed up software development activities including auto code completion, intellisense, schema-based intellisense, model-based intellisense, schema-based validation, model-based validation, and software annotation help. Fourth, the web-based IDE supports management of web-based entity data model extensible markup language (XML) (EDMX) files that define a software model. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 5 is an example screenshot of an EDMX model schema validation according to an implementation.

FIGS. 6A-6C are example screenshots for providing model-based suggestions according to an implementation.

Like reference numbers and designations in the various drawings indicate like elements.

DETAILED DESCRIPTION

Figure 1:
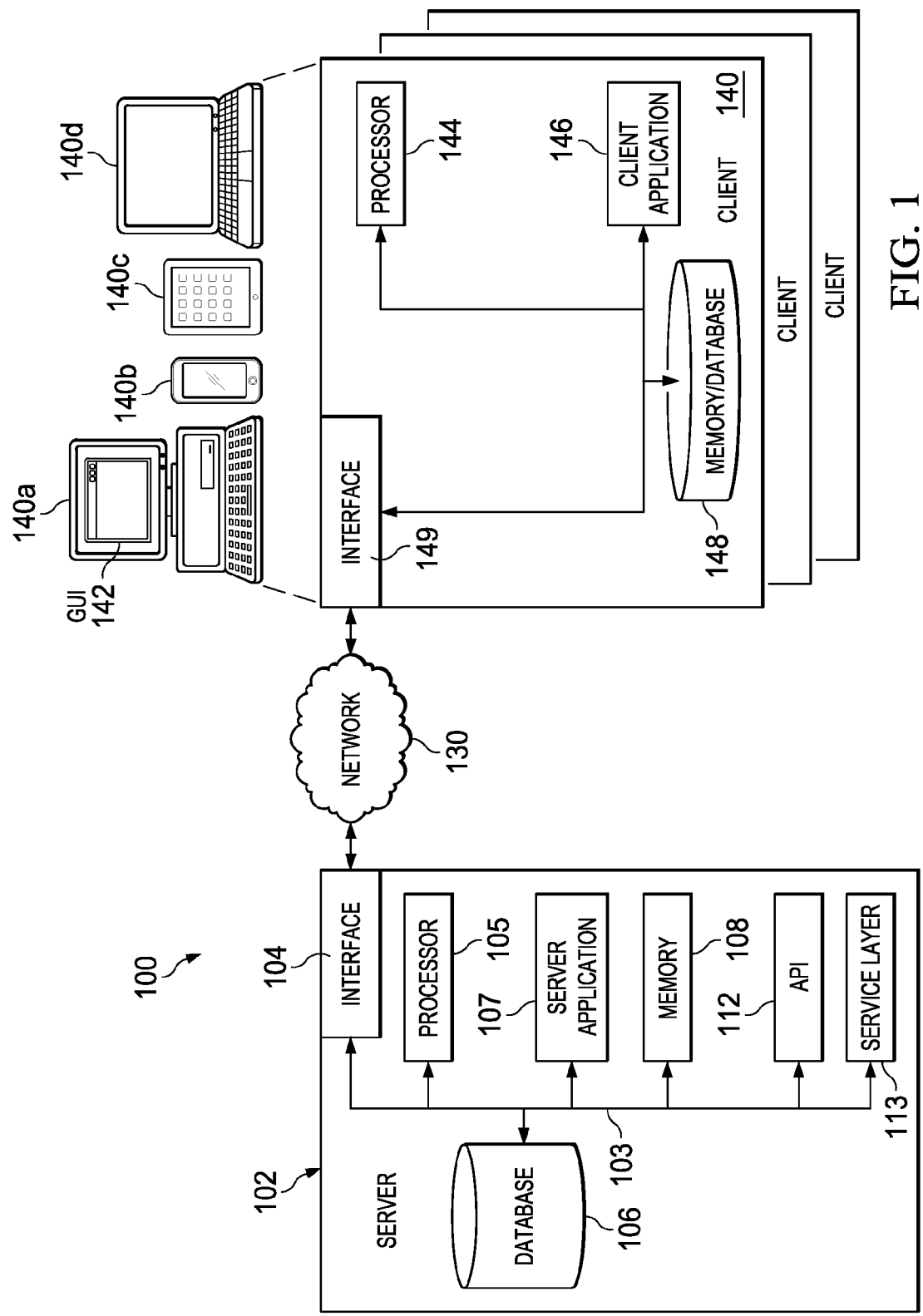
FIG. 1 is a block diagram illustrating an example distributed computing system (EDCS) for providing a web-based integrated development environment (IDE) solution hosted on cloud environment according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

An integrated development environment (IDE) is a software application that provides comprehensive facilities to computer programmers for software development. Some IDE features include, a source code editor, a compiler and/or an interpreter, build automation tools, and/or a debugger. There are two categories of IDE's: 1) a traditional desktop-based IDE and 2) a web-based IDE. A web-based IDE is a browser-based code development environment requiring no installation on a local developer workstation and which can be accessed with a connection to the server and an available browser using, for example, hypertext markup language (HTML) 5-based UI technology. A web-based IDE reduces hardware costs and management overhead while ensuring everyone with latest IDE version and patches. Consequently, developers can make code changes from anywhere, using any machine. Without the ability to manage Entity Data Model extensible markup language (XML) (EDMX) files with support for, example, context-aware intelligent code completion (intellisense) and real-time validations, software development is more costly, takes more time, can be a less-than-pleasant experience, and requires more overall effort.

In some implementations, an exemplary web-based IDE editor would include:
  a) Auto code completion—e.g., when keys are pressed in the editor, related model (e.g., EDMX) elements with appropriate code snippets are highlighted for selection.
  b) Intellisense—Should activate with a key sequence is pressed (e.g., CTRL+Space) to display context-aware proposals and provide suggestions in the form of pre-defined code snippet templates.
  c) Schema based intellisense—Pertaining to EDMX schema definition.
  d) Validation—Real time/On save validations can be triggered to validate both an EDMX schema & model.
  e) Annotation Help—Where ever appropriate custom annotations on EDMX elements can be shown in intellisense.

The editor will also include on-the-fly intelligent model based suggestions pertaining to a current EDMX model (e.g., in construction)—meaning that the editor needs to understand a current EDMX model using an adaptive and intelligent data structure for storage in memory and to provide context aware model suggestions at appropriate places in the editor using a mechanism to capture the current context for proposals. In some implementations, the adaptive and intelligent data structure is the return type object mentioned in a respective algorithm and includes pre-defined schema templates in, for example, JAVASCRIPT Object Notation (JSON) format. In some particular implementations, the above-mentioned mechanism can be, for example:
  a) Obtain a current cursor location where a user press CTRL+Space key.
  b) From begining of the file to the current cursor location, parse the edited text to determine all the keywords typed.
  c) Based on the currently edited keyword, attempt to match the keywords from pre-defined schema templates (e.g., in common schema definition language 2.0, etc.).
  d) Based on apossible match of keywords, construct context-based suggestions.
  e) Suggestion building logic is is described in relation to the high-level algorithm described below.

FIG. 1 is a block diagram illustrating an example distributed computing system (EDCS) 100 for providing a web-based IDE solution hosted on cloud environment according to an implementation. The illustrated EDCS 100 includes or is communicably coupled with one or more servers 102 and clients 140 that communicate across a network 130. In some implementations, one or more components of the EDCS 100 may be configured to operate within a cloud-computing-based environment.

At a high level, the server 102 is an electronic computing device operable to receive, transmit, process, store, or manage data and information associated with the EDCS 100. In general, the server 102 provides functionality appropriate to a server, including database functionality and receiving/serving content and/or functionality from/to a client permitting, for example, provision of a web-based integrated development environment (IDE) solution hosted on cloud environment as described herein. According to some implementations, the server 102 may also include or be communicably coupled with an e-mail server, a web server, a caching server, a streaming data server, a business intelligence (BI) server, and/or other server.

The server 102 is responsible for receiving, among other things, data, requests, and/or content from one or more client applications 146 associated with the client 140 of the EDCS 100. In some implementations, the server 102 can be responsible for acting as an open source platform for cloud based development (e.g., an ORION application/web server although other types of application/web servers can be used) managing and maintaining developer workspaces and/or as an element of a content distribution network (CDN) serving content to end-users (e.g., software developers using a client 140) with high availability and high performance (see FIG. 2). The server 102 can also respond to received requests, for example requests processed by a server application 107, database 106, and/or other elements of the server 102.

In addition to requests received from the client 140, requests may also be sent to the server 102 from internal users, external or third-parties, other automated applications, as well as any other appropriate entities, individuals, systems, or computers. In some implementations, various requests can be sent directly to server 102 from a user accessing server 102 directly (e.g., from a server command console or by other appropriate access method).

Each of the components of the server 102 can communicate using a system bus 103. In some implementations, any and/or all the components of the server 102, both hardware and/or software, may interface with each other and/or the interface 104 over the system bus 103 using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure. For example, the API 112 could be integrated into the database 106, the server application 107, and/or wholly or partially in other components of server 102 (whether or not illustrated).

The server 102 includes an interface 104. Although illustrated as a single interface 104 in FIG. 1, two or more interfaces 104 may be used according to particular needs, desires, or particular implementations of the EDCS 100. The interface 104 is used by the server 102 for communicating with other systems in a distributed environment—including within the EDCS 100—connected to the network 130; for example, the client 140 as well as other systems communicably coupled to the network 130 (whether illustrated or not). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The server 102 includes a processor 105. Although illustrated as a single processor 105 in FIG. 1, two or more processors may be used according to particular needs, desires, or particular implementations of the EDCS 100. Generally, the processor 105 executes instructions and manipulates data to perform the operations of the server 102. Specifically, the processor 105 executes the functionality required for providing a web-based IDE solution hosted on a cloud environment.

The server 102 also includes a database 106 that holds data for the server 102, client 140, and/or other components of the EDCS 100. Although illustrated as a single database 106 in FIG. 1, two or more databases may be used according to particular needs, desires, or particular implementations of the EDCS 100. While database 106 is illustrated as an integral component of the server 102, in alternative implementations, database 106 can be external to the server 102 and/or the EDCS 100. In some implementations (e.g., see FIG. 2), database 106 can be configured to store one or more instances of (not illustrated) IDE assets, configurations, templates, a file system(s), UI5 libraries, UI5 RT (UI5 runtime support), and/or other appropriate data (e.g., user profiles, objects and content, client data, etc. In some implementations, the ORION server can include: a) IDE Assets—IDE-specific bootstrap files, b) Configurations—plug-in IDE-specific configuration files, c) Templates—plug-in specific templates helping to create files with default configurations (e.g., project folders with default files, and d) File System—dedicated hard disk folders to persist files created by users. The UI5 CDN is a UI5 CDN including: a) UI5 Libs—a proprietary wrapper on top of HTML5 libraries, and b) the UI5 RT.

The server application 107 is an algorithmic software engine capable of providing, among other things, any appropriate function consistent with this disclosure for the server 102 (e.g., acting as an open source platform for cloud based development,—managing and maintaining developer workspaces and/or a CDN). In some implementations, the server application 107 can be used for functions particular to the server 102 and/or one or more clients 140 (e.g., receiving from, processing, and/or transmitting data to a client 140). In some implementations, the server application 107 can provide, store, and/or modify content provided by and/or made available to other components of the EDCS 100. In other words, the server application 107 can act in conjunction with one or more other components of the server 102 and/or EDCS 100 in responding to a request for content received from the client 140. For example, in some implementations the server application 107 can work in conjunction with the database 106/memory 108 to provide a web-based integrated development environment (IDE) solution hosted on cloud environment.

Although illustrated as a single server application 107, the server application 107 may be implemented as multiple server applications 107. In addition, although illustrated as integral to the server 102, in alternative implementations, the server application 107 can be external to the server 102 and/or the EDCS 100 (e.g., wholly or partially executing on the client 140, other server 102 (not illustrated), etc.). Once a particular server application 107 is launched, the particular server application 107 can be used, for example by an application or other component of the EDCS 100 to interactively process received requests (e.g., from client 140). In some implementations, the server application 107 may be a network-based, web-based, and/or other suitable application consistent with this disclosure.

In some implementations, a particular server application 107 may operate in response to and in connection with at least one request received from other server applications 107, other components (e.g., software and/or hardware modules) associated with another server 102, and/or other components of the EDCS 100. In some implementations, the server application 107 can be accessed and executed in a cloud-based computing environment using the network 130. In some implementations, a portion of a particular server application 107 may be a web service associated with the server application 107 that is remotely called, while another portion of the server application 107 may be an interface object or agent bundled for processing by any suitable component of the EDCS 100. Moreover, any or all of a particular server application 107 may be a child or sub-module of another software module or application (not illustrated) without departing from the scope of this disclosure. Still further, portions of the particular server application 107 may be executed or accessed by a user working directly at the server 102, as well as remotely at a corresponding client 140. In some implementations, the server 102 or any suitable component of server 102 or the EDCS 100 can execute the server application 107.

The memory 108 typically stores objects and/or data associated with the purposes of the server 102 but may also be used in conjunction with the database 106 to store, transfer, manipulate, etc. objects and/or data. The memory

108 can also consistent with other memories within the EDCS 100 and be used to store data similar to that stored in the other memories of the EDCS 100 for purposes such as backup, caching, and/or other purposes.

The client 140 may be any computing device operable to connect to and/or communicate with at least the server 102. In general, the client 140 comprises an electronic computing device operable to receive, transmit, process, and store any appropriate data associated with the EDCS 100, for example, the server application 107. More particularly, among other things, the client 140 can collect content from the client 140 and upload the collected content to the server 102 for integration/processing into/by the server application 107. The client typically includes a processor 144, a client application 146, a memory/database 148, and/or an interface 149 interfacing over a system bus 141.

In some implementations, the client application 146 can use parameters, metadata, and other information received at launch to access a particular set of data from the server 102 and/or other components of the EDCS 100. Once a particular client application 146 is launched, a user may interactively process a task, event, or other information associated with the server 102 and/or other components of the EDCS 100. For example, the client application 146 can generate and transmit a particular database request to the server 102.

The client application 146 is any type of application (or, for example, a combination of applications, plug-ins, editors, etc.) that allows the client 140 to navigate to/from, request, view, create, edit, delete, administer, and/or manipulate content associated with the server 102 and/or the client 140. For example, the client application 146 can present GUI displays and associated data (e.g., an IDE) to a user that is generated/transmitted by the server 102 (e.g., the server application 107, and/or database 106).

In some implementations, the client application 146 can also be used perform administrative functions related to the client 140, server application 107, database 106, and/or the server 102 in general. For example, the server application 107 can generate and/or transmit administrative pages to the client application 146 based on a particular user login, request, etc. to allow access to configurations and/or any other data on the server 102.

Further, although illustrated as a single client application 146, the client application 146 may be implemented as multiple client applications in the client 140. For example, there may be a native client application and a web-based (e.g., HTML) client application depending upon the particular needs of the client 140 and/or the EDCS 100.

The interface 149 is used by the client 140 for communicating with other computing systems in a distributed computing system environment, including within the EDCS 100, using network 130. For example, the client 140 uses the interface to communicate with a server 102 as well as other systems (not illustrated) that can be communicably coupled to the network 130. The interface 149 may be consistent with the above-described interface 104 of the server 102. The processor 144 may be consistent with the above-described processor 105 of the server 102. Specifically, the processor 144 executes instructions and manipulates data to perform the operations of the client 140, including the functionality required to send requests to the server 102, receive and process responses from the server 102, process data on the client, and/or other operations.

The memory/database 148 typically stores objects and/or data associated with the purposes of the client 140 but may also be consistent with the above-described database 106 and/or memory 108 of the server 102 or other memories within the EDCS 100 and be used to store data similar to that stored in the other memories of the EDCS 100 for purposes such as backup, caching, and the like. Although illustrated as a combined memory/database, in some implementations, the memory and database can be separated (e.g., as in the server 102).

Further, the illustrated client 140 includes a GUI 142 that interfaces with at least a portion of the EDCS 100 for any suitable purpose. For example, the GUI 142 (illustrated as associated with client 140*a*) may be used to view data associated with the client 140, the server 102, or any other component of the EDCS 100. In particular, in some implementations, the client application 146 may render GUI interfaces received from the server application 107 and/or data retrieved from any element of the EDCS 100.

There may be any number of clients 140 associated with, or external to, the EDCS 100. For example, while the illustrated EDCS 100 includes one client 140 communicably coupled to the server 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (example configurations illustrated as 140*a*-140*d*) is intended to encompass any computing device such as a desktop computer/server, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142 (illustrated by way of example only with respect to the client 140*a*).

Figure 2:
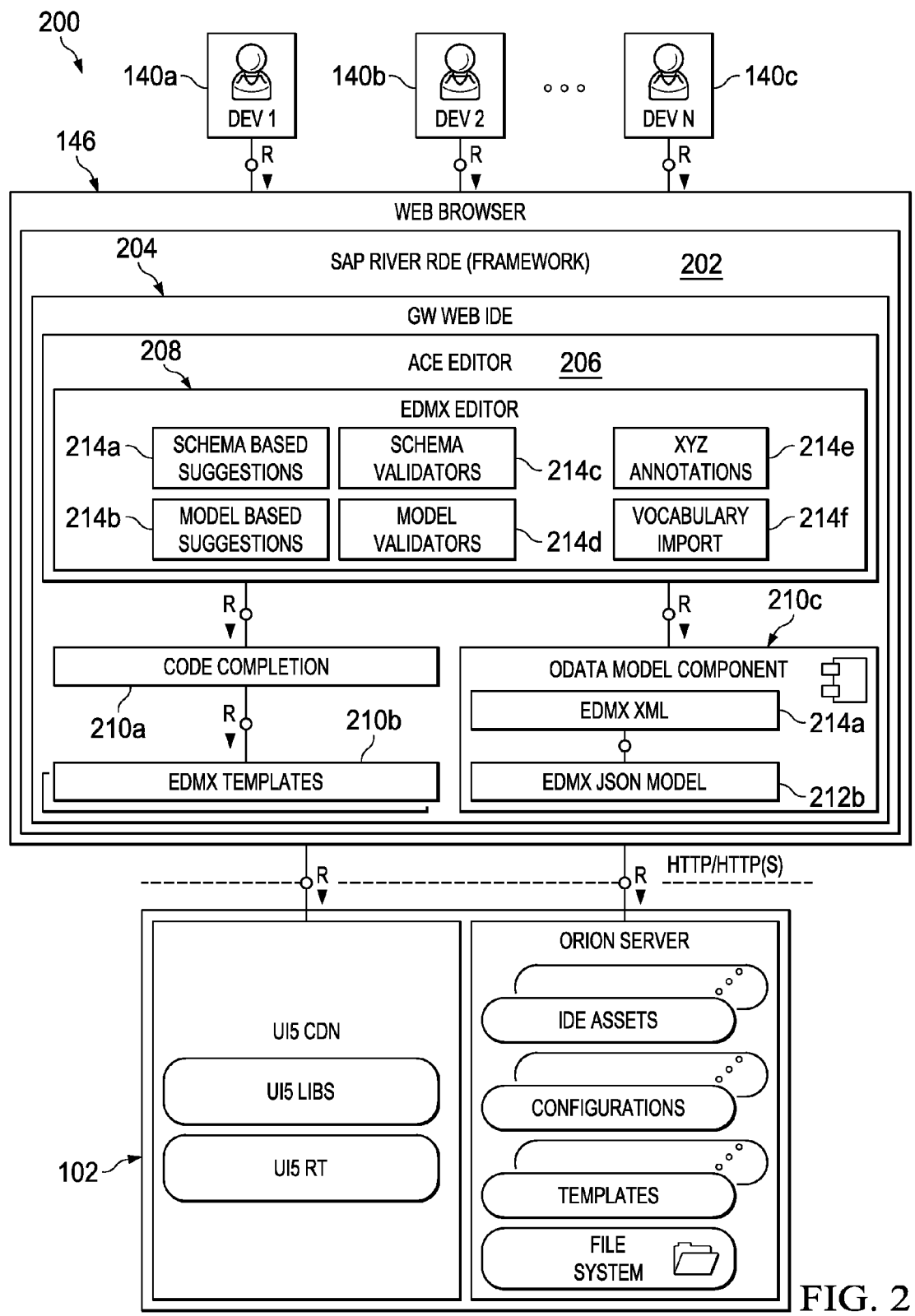
FIG. 2 is a block diagram illustrating an example client/server architecture for providing a web-based IDE hosted on cloud environment according to an implementation.

FIG. 2 is a block diagram 200 illustrating an example client/server architecture for providing a web-based IDE hosted on cloud environment according to an implementation. At a high level, as illustrated, diagram 200 includes multiple clients 140 (as Dev 1 140*a*, Dev 2 140*b*, . . . , Dev N 140*n*), a client application 146 (as a web browser), and a server 102 (as either an ORION server or a UI5 CDN based on hypertext markup language (HTML) 5 user interface (UI) technology).

In some implementations, the web browser 146 includes, contains, and/or interfaces with one or more of a web application toolkit (WATT) framework 202, a gateway web IDE plugin 204 for the framework 202, and a high-performance web code editor (ACE) 206, and an EDMX editor 208. The web browser 146 can be any standard commercially available and/or custom web browser.

The framework 202 is a web application toolkit providing a framework for an internal/external/partner developer community to contribute plug-in technology to support specialized capabilities (e.g., similar to the ECLIPSE IDE+plug-in contributions from others).

The GW web IDE 204 is an internal plug-in contributor to framework 202 providing specialized editor support for open data protocol (ODATA) modeling (a.k.a. EDMX) capabilities. The GW Web IDE 204 includes code completion 210*a*, EDMX templates 210*b*, and an open data protocol (OData) model component 210*c* to provide the described functionality. The OData model component 210*c* contains EDMX extensible markup language (XML) 212*a* and an EDMX JAVASCRIPT Object Notation model 212*b*. Note that JSON contains key/values pairs, EDMX contains XML element/values. In converting XML to JSON, XML elements/values are converted to JSON key/values. In some implementations, JSON has advantages in that it is: a) easier to parse than XML and b) JSON carries less of a data payload than XML.

The EDMX editor 208 includes schema based suggestions 214*a* providing [CSDL?] schema suggestions based on a current position in an IDE editor, model based suggestions 214*b* providing on-the-fly model-specific suggestions based on a model's current construction, schema validators 214*c* showcasing schema validation errors at a specific line in an IDE editor based on CSDL schema rules, model validators 214*d* showcasing model validation errors base on pre-defined rules, XYZ annotations 214*e* (note that XYZ-specific annotations are applicable to a few EDMX elements, and are machine understandable key/value pairs providing additional related functionalities), and/or vocabulary import 214*f* as a placeholder for future support of future versions of the OData protocol (e.g., 4.0 and higher).

In some implementations, an example usage/data flow scenario can be as follows:
  a) From a browser, user logs in to the framework 202 by using a cloud computing account.
  b) On successful login, the framework 202 application will be hosted on the user browser (e.g., in browser memory).
  c) The user decides to work on (e.g., create, edit, etc.) an EDMX file.
  d) On the EDMX file, the user starts typing characters in an editor.
  e) When the user press keys from keyboard, auto completion suggestions are proposed, if the auto proposal is something that the user needs (satisfactory), the user can select the auto proposal & code completion snippets are pre-filled in the editor (which reduces typing efforts) with the help of pre-defined schema templates which are persisted in the ORION server
  f) If the auto proposals are not satisfactory, the user would like to know more information/proposals and can press the CTRL+Space keys. The 'schema suggestion' algorithm then kicks in and additional information/proposals are computed based on templates and interested keyword.
  g) Schema validation also activates to check that edited EDMX elements adhere to schema rules. An XML schema definition (XSD) file from the ORION server is loaded into browser memory and validated with the edited model using the trigger schema validation algorithm.I If any errors are reported, the errors can be showcased in an editor gutter.
  h) When the user realizes the edited model is correct, model validation can be triggered manually by the user. The model validation algorithm istriggered. In browser memory, a rule engine fires element-specific rules pertaining to currently edited model elements. Any errors are displayed in a dialog box, error console, etc.
  i) At any point in time, the user can save an edited model (with or without errors) using the browser. All file-level operations (e.g., save, undo, redo, copy, paste, etc.) will contact the ORION server to fulfil the request. Note that most user operations in the editor are managed from browser memory and related files/data needed are loaded from the ORION server to the browser using a cloud-based computing infrastructure.

Figure 3A:
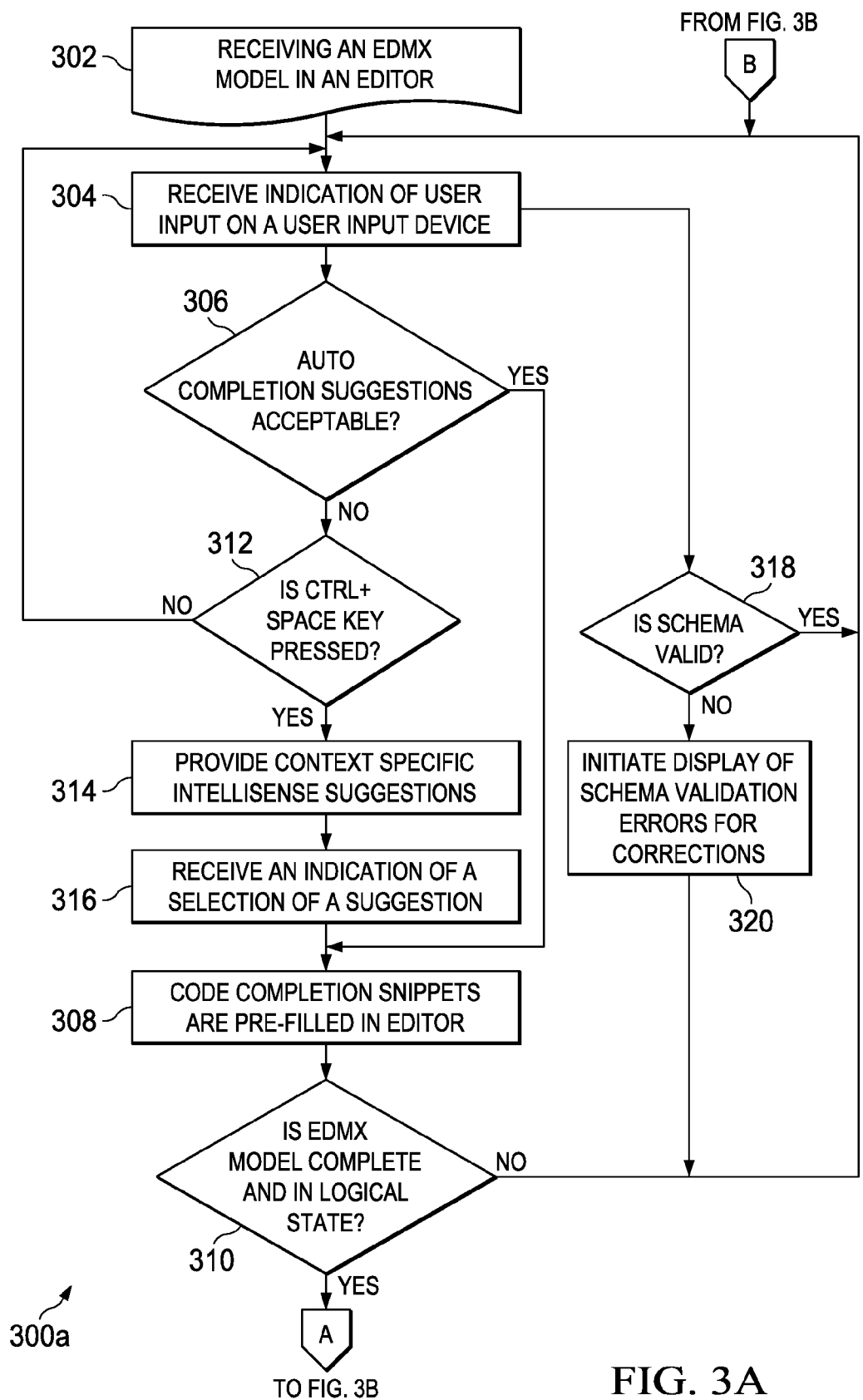
FIGS. 3A and 3B represent a flow chart illustrating a method for providing a web-based IDE solution hosted on cloud environment according to an implementation.
Figure 3B:
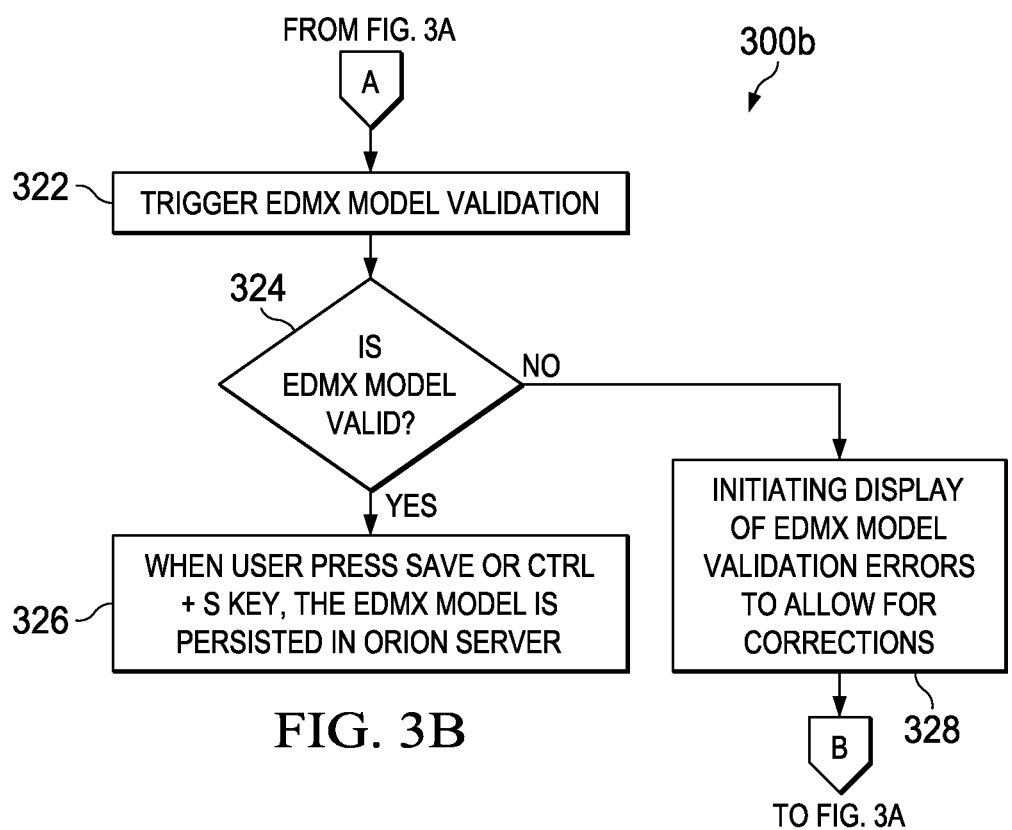

FIGS. 3A and 3B represent a flow chart illustrating a method 300 for providing a web-based IDE solution hosted on cloud environment according to an implementation. For clarity of presentation, the description that follows generally describes method 300 in the context of FIGS. 1, 2, 4A-4B, 5, 6A-6C, and 7. However, it will be understood that method 300 may be performed, for example, by any other suitable system, environment, software, and hardware, or a combination of systems, environments, software, and hardware as appropriate. Note that the provided method 300 is only one possible usage sequence/scenario. In some implementations, various steps of method 300 can be run in parallel, in combination, in loops, and/or in any order—including not at all. Those of ordinary skill should understand modifications to method 300 necessary to reflect other possible sequences.

At 302, a user (e.g., a software developer) receives an EDMX model using an IDE editor to work with the EDMX model. Although described using an EDMX model, those of ordinary skill will understand that in other implementations, models other than an EDMX model can also be worked with. From 302, method 300 proceeds to 304.

At 304, an indication of user input is received from a user input device (e.g., the user presses characters on a keyboard or other input type device providing similar functionality). In some implementations, auto-completion recommendations are provided based on the received user input. From 304, method 300 proceeds to 306.

At 306, a determination is made whether IDE editor provided auto-completion suggestions are acceptable. If acceptable, method 300 proceeds to 308. If not acceptable, method 300 proceeds to 312.

At 308, code completion snippets are pre-filled into the IDE editor. From 308, method 300 proceeds to 310.

At 310, a determination is made whether the EDMX model is complete and in a logical state. If not complete and in a logical state, method 300 proceeds back to 304. Whether the EDMX model is complete and in a logical state is typically decided by a developer during a model creation process. For example, any (but not limited to) of the following scenarios can be considered as complete and in a logical state:
  a) When all entities and associated properties are well defined according to criteria.
  b) When relationships among entities are well defined according to critera.
  c) When all schema validation errors are corrected.

If the EDMX model is determined to be in a complete and logical state, method 300 proceeds to 322 (on FIG. 3B).

At 322, a model validation is triggered. From 322, method 300 proceeds to 324.

At 324, a determination is made whether the EDMX model is valid. If the EDMX model is valid, method 300 proceeds to 326. If the model is not valid, method 300 proceeds to 328.

At 326, upon an indication to save the EDMX model (e.g., use of CTRL+S on a user input device), the EDMX model is persisted in the ORION server.

At 328, an initiation of a display of model validation errors is performed to allow the user to make corrections.

In some implementations, the following high-level algorithm can be used:

```
If (No Schema Errors)
    JSON Object Model ← Parse current EDMX XML from editor to
    JSON
    For each element in JSON object model
        Local_ErrorList [ ] ← Trigger its validation rules against
        element
        ErrorList.append (Local_ErrorList [ ]);
    End For
End If
Return ErrorList [ ].
```

Input for the algorithm can include EDMX XML. Output typically includes a list of EDMX model validation errors.

Figure 7:
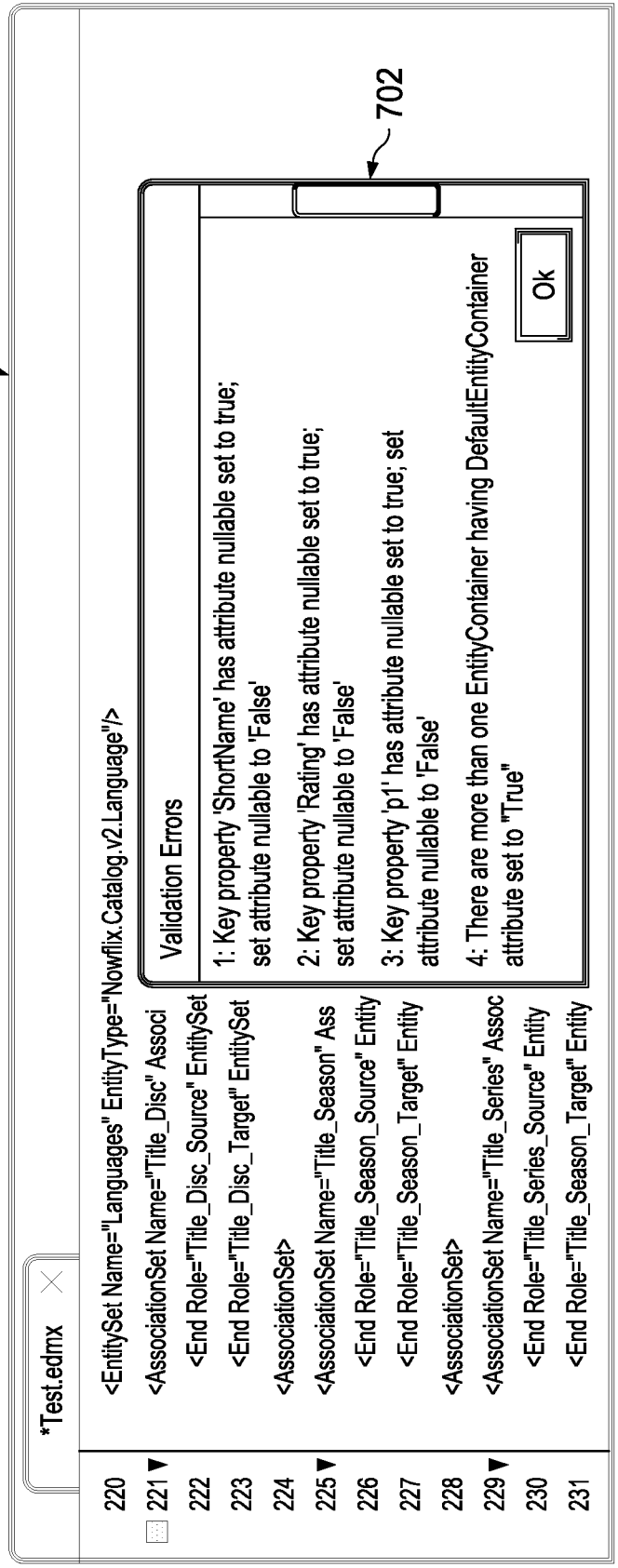
FIG. 7 is an example screenshot of an EDMX model validation according to an implementation.

Referring to FIG. 7, FIG. 7 is an example screenshot 700 of an EDMX model validation according to an implementation. FIG. 7 shows an example model validation error 702. As an example, at high level, a model is a) parsed to a JSON object; b.) Based on an element in an object, a rule engine triggers element specific rules; c.) the errors are accumulated as an error collection (e.g., in a persistency, data structure, or some other error collection); and d.)) errors are shown in a dialog (e.g. 702) to allow for corrections to be made. In the example screenshot 700, a user is notified of various errors along with a suggested course of action to correct the error (e.g., "1: Key property 'ShortName' has attribute nullable set to true; set attributed nullable to 'False'." Note that, the model validation errors cannot generally be captured while performing schema validation as they adhere to schema (syntax) specifications. The model validation errors are more semantic/logical-type errors in a particular model.

From 328, method 300 proceeds back to 304.

Returning back to 306, if auto completion suggestions are not acceptable, method 300 proceeds to 312.

At 312, a determination is made whether a particular user input device input combination is pressed (e.g., a particular key sequence is pressed on the keyboard, such as CTRL+SPACE or some other combination). If the key sequence is not pressed, method 300 proceeds back to 304. If the key sequence is pressed, method 300 proceeds to 314.

At 314, context specific intellisense suggestions are provided.

In some implementations, the following high-level algorithm can be used:

```
For every CTRL + Space key pressed inside editor
    a) Keyword ← Getting current editor cursor position and its related
    keyword.
    b) Proposals [ ] ← Get proposals of the current context from
pre-defined templates.
End For
Return Proposals [ ].
```

Input for the algorithm can include EDMX XML and pre-defined CSDL templates. Output typically includes a list of schema-based suggestions for user selection.

Figure 4A:
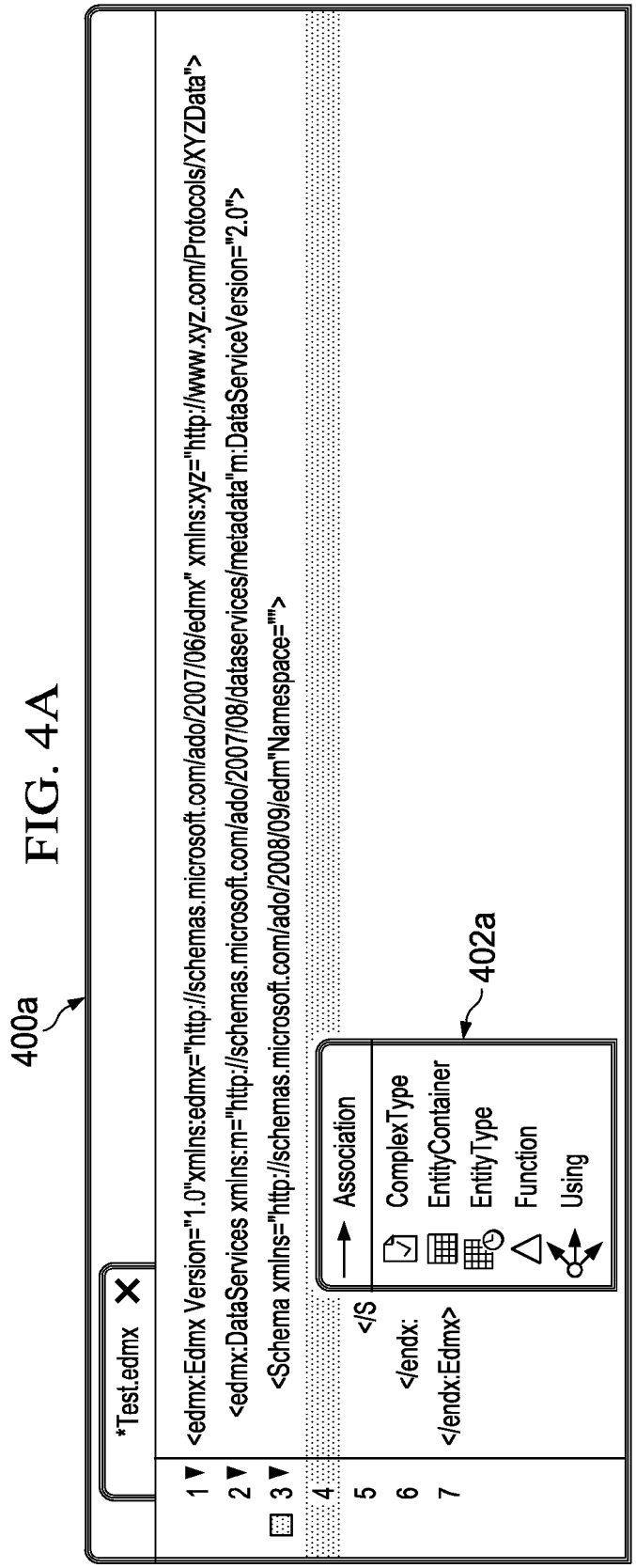
FIGS. 4A and 4B are example screenshots for providing entity data model extensible markup language (XML) (EDMX) files model schema suggestions according to an implementation.
Figure 4B:

Referring to FIGS. 4A and 4B, FIGS. 4A and 4B are example screenshots 400a and 400b, respectively, for providing schema-based suggestions according to an implementation. FIG. 4A shows a schema based suggestion 402a while FIG. 4B shows an annotation suggestion 402b. As an example, a.) a cursor position is obtained when a user press CTRL+S; b.) the current edited EDMX model is parsed to determine all elements/tokens, c.) current elements/tokens are detected (where the user needs assistance); d.) elements/tokens are looked up from pre-defined schema templates; e.) possible proposal objects are constructed; and f.) proposals are showcased in an intellisense display for selection. In the example screenshot 400a, possible element proposals inside 'Schema' element are presented to a user, whereas, in screenshot 400b, possible properties proposals inside a 'Property' element are presented to a user. Schema intellisense also proposes custom annotations at various element/attribute level which can be outside of a CSDL specification (e.g., proprietary specific annotations).

In some implementations, the following high-level algorithm can also be used:

```
For every CTRL + Space key pressed inside editor
    a) Keyword ← Getting current editor cursor position and its
related keyword.
    b) JSON Object Model ← Parse current EDMX XML from
editor to JSON.
    c) Suggestions [ ] ← Retrieving suggestions from
    pre-defined templates for the Keyword.
        For each suggestion from Suggestions [ ]
            Local_ Proposals [ ] ← Traversing JSON object model
to get all the relevant proposals for the suggestion.
            Proposals.append (Local_Proposals [ ]);
        End for
        Return Proposals [ ]
    End for.
```

Input for the algorithm can include pre-defined CSDL templates. Output typically includes a list of model-based suggestions for user selection.

Referring to FIGS. 6A-6C, FIGS. 6A-6C are example screenshots 600a-600c, respectively, for providing model-based schema suggestions according to an implementation. FIG. 6A shows a suggestion 602a of available EntityTypes in an EDMX model for an EntitySet element. FIG. 6B shows a suggestion 602b of valid PropertyRefs based on available properties in an EntityType. FIG. 6C shows a suggestion 602c of available Associations in the EDMX model for an AssociationSet element. As an example, a.) a current element is retrieved when a user press CTRL+Space key; b.) the context is obtained, for example, to determine if user is interested in knowing possible values for an given property; c.) available values are looked up in a model to propose to the user (e.g., for 'entityset' element and available 'entitytype' property values of the 'entityset' element, a user would like to know the available entity types from the model to fill in. In the example screenshot 600a, possible entitytype value proposals inside 'EntitySet' element are presented to a user. In screenshot 600b, possible property value proposal inside a PropertyRef element are presented to a user. In screenshot 600c, possible association value proposals inside 'AssociationSet' element are presented to a user. Model intellisense proposes appropriate values at certain property levels by understanding the current model which is in construction.

From 314, method 300 proceeds to 316.

At 316, the user picks an appropriate suggestion from the provided intellisense suggestions. From 316, method 300 proceeds to 308.

Returning back to 304, when a user presses a key on the keyboard, method 300 also proceeds to 318. For example, in some implementations, 306 and 318 can be performed in parallel. At 318, a determination is made whether the schema is valid. If the schema is valid, method 300 proceeds to 304. If the schema is not valid, method 300 proceeds to 320.

In some implementations, the following high-level algorithm can be used:

---
ErrorList [ ] ← Validate XML against given ODATA XSD (a file containing rules adhering to an EDMX schema. All EDMX files created should adhere to the rules specified in the ODATA XSD and any violations are reported as errors) & get all validation errors.
Return ErrorList [ ].

---

Input for the algorithm can include EDMX XML and OData XSD (as described above). Output typically includes an error list to allow for user corrective actions.

Referring to FIG. 5, FIG. 5 is an example screenshot 500 of an EDMX model schema validation according to an implementation. Example schema validation error 502 is represented.

At 320, a display of schema validation errors is initiated to allow the user to make corrections. From 320, method 300 proceeds to 304.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   receiving an entity data model extensible markup language (XML) (EDMX) model;
   in parallel, receiving an indication of user input from a user input device of a client computing device during user development of application code associated with the EDMX model and determining whether a schema associated with the received user input is valid, where the determination is made using an open data protocol (ODATA) XML schema definition (XSD) file received from a data store external to the client computing device;
   providing auto completion suggestions based on received user input, the providing based on a current cursor position within a then-current state of the application code, the auto completion suggestions consistent with the EDMX model and based on values of elements and/or tokens in the application code and substantially adjacent to the current cursor position;
   receiving a user selection of a suggestion;
   determining whether the user selection is acceptable;
   updating the application code based on the received user selection; and
   validating the EDMX model as complete and logical.

2. The method of claim 1, further comprising initiating display of schema validation errors.

3. The method of claim 1, further comprising:
   determining that a particular user input device input combination is pressed; and
   providing context-specific code-completion suggestions.

4. The method of claim 3, further comprising receiving an indication of a selection of a particular context-specific code-completion suggestion.

5. The method of claim 1, further comprising prefilling auto completion code snippets into an editor.

6. The method of claim 1, further comprising:
   triggering EDMX model validation;
   determining the validity of the EDMX model; and
   initiating a display of EDMX model validation errors.

7. A non-transitory, computer-readable medium storing computer-readable instructions executable by a computer and configured to:
   receive an entity data model extensible markup language (XML) (EDMX) model;
   in parallel, receive an indication of user input from a user input device of a client computing device during user development of application code associated with the EDMX model and determining whether a schema associated with the received user input is valid, where the determination is made using an open data protocol (ODATA) XML schema definition (XSD) file received from a data store external to the client computing device;
   provide auto completion suggestions based on received user input, the providing based on a current cursor position within a then-current state of the application code, the auto completion suggestions consistent with the EDMX model and based on values of elements and/or tokens in the application code and substantially adjacent to the current cursor position;
   determine whether the user selection is acceptable;
   update the application code based on the received user selection; and
   validate the EDMX model as complete and logical.

8. The medium of claim 7, further comprising instructions to initiate display of schema validation errors.

9. The medium of claim 7, further comprising instructions to:
   determine that a particular user input device input combination is pressed; and
   provide context-specific code-completion suggestions.

10. The medium of claim 9, further comprising instructions to receive an indication of a selection of a particular context-specific code-completion suggestion.

11. The medium of claim 7, further comprising instructions to prefill auto completion code snippets into an editor.

12. The medium of claim 7, further comprising instructions to:
    trigger EDMX model validation;
    determine the validity of the EDMX model; and
    initiate a display of EDMX model validation errors.

13. A system, comprising:
    a memory;
    at least one hardware processor interoperably coupled with the memory and configured to:
      receive an entity data model extensible markup language (XML) (EDMX) model;
      in parallel, receive an indication of user input from a user input device of a client computing device during user development of application code associated with the EDMX model and determining whether a schema associated with the received user input is valid, where the determination is made using an open data protocol (ODATA) XML schema definition (XSD) file received from a data store external to the client computing device;
      provide auto completion suggestions based on received user input, the providing based on a current cursor position within a then-current state of the application code, the auto completion suggestions consistent with the EDMX model and based on values of elements and/or tokens in the application code and substantially adjacent to the current cursor position;
      determine whether the user selection is acceptable;
      update the application code based on the received user selection; and
      validate the EDMX model as complete and logical.

14. The system of claim 13, further configured to initiate display of schema validation errors.

15. The system of claim 13, further configured to:
    determine that a particular user input device input combination is pressed; and
    provide context-specific code-completion suggestions.

16. The system of claim 15, further configured to receive an indication of a selection of a particular context-specific code-completion suggestion.

17. The system of claim 13, further configured to:
    prefill auto completion code snippets into an editor;
    trigger EDMX model validation;
    determine the validity of the EDMX model; and
    initiate a display of EDMX model validation errors.

* * * * *